Aug. 8, 1967    C. L. DAY    3,334,955
METHOD AND APPARATUS FOR MAKING VACUUM TUBES
Filed June 3, 1965    3 Sheets-Sheet 3
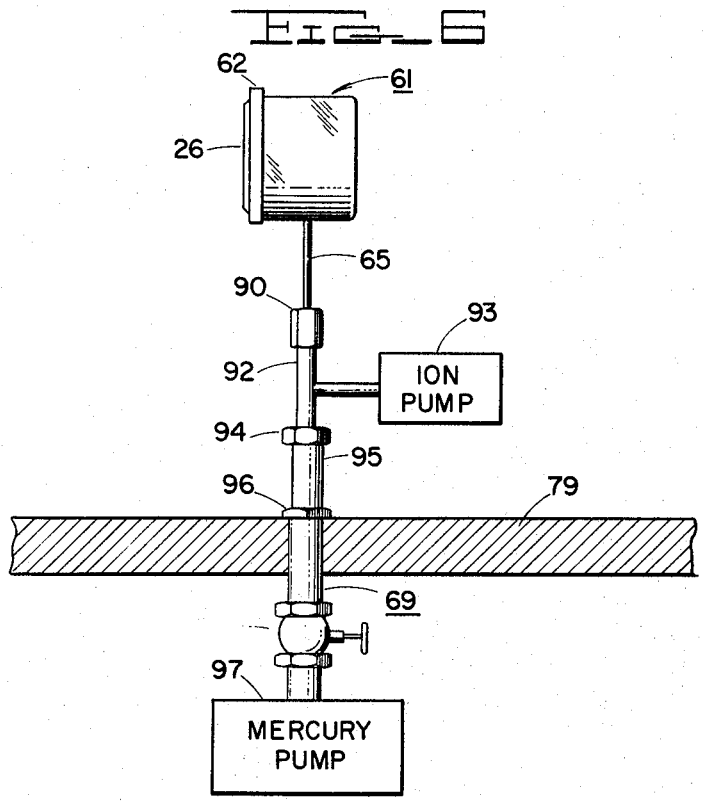
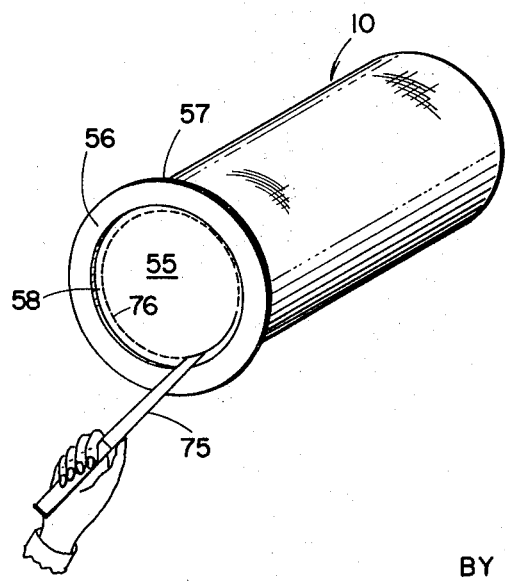
INVENTOR
CYRIL L. DAY
BY Hood, Gust & Irish
ATTORNEYS

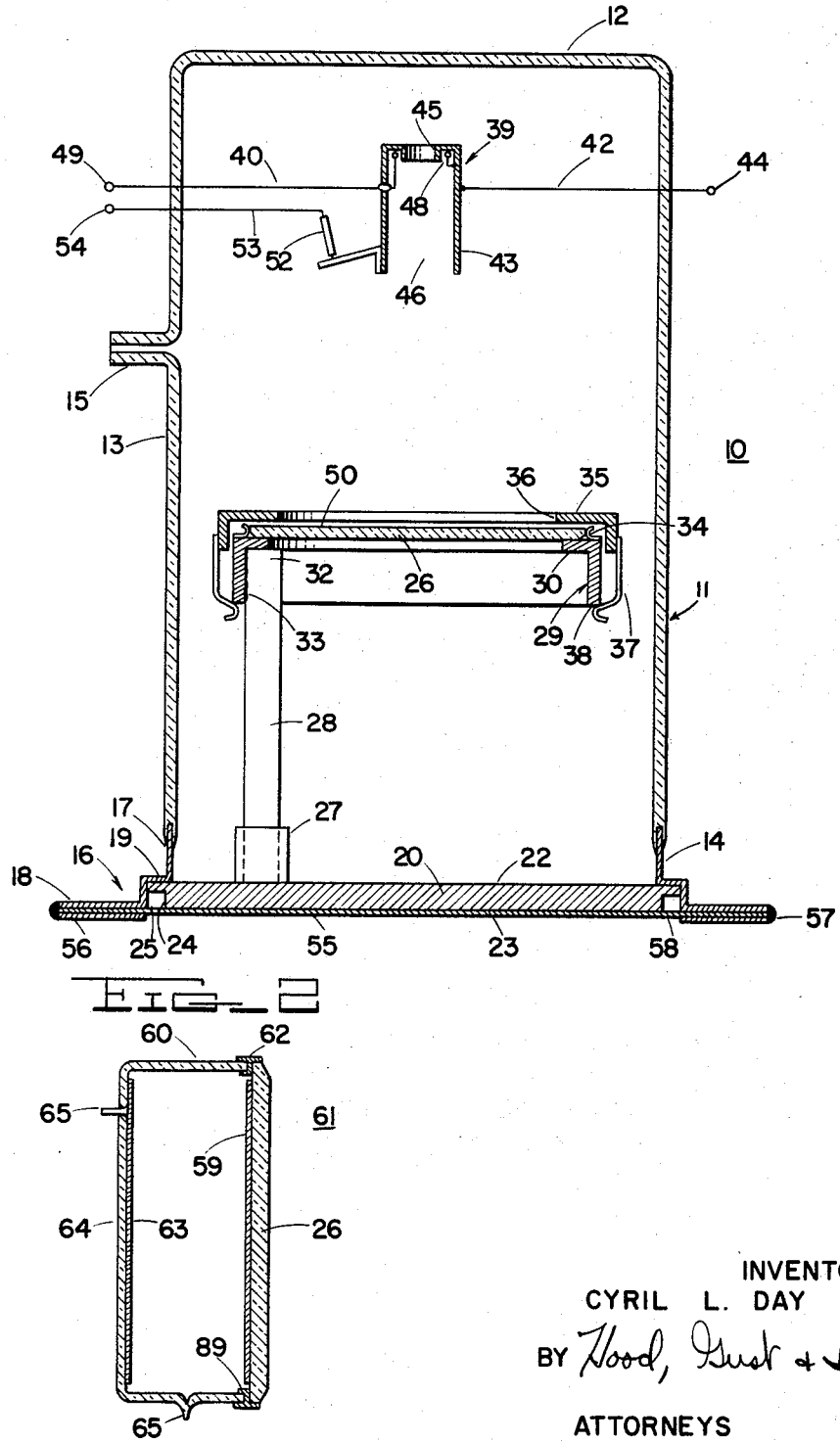

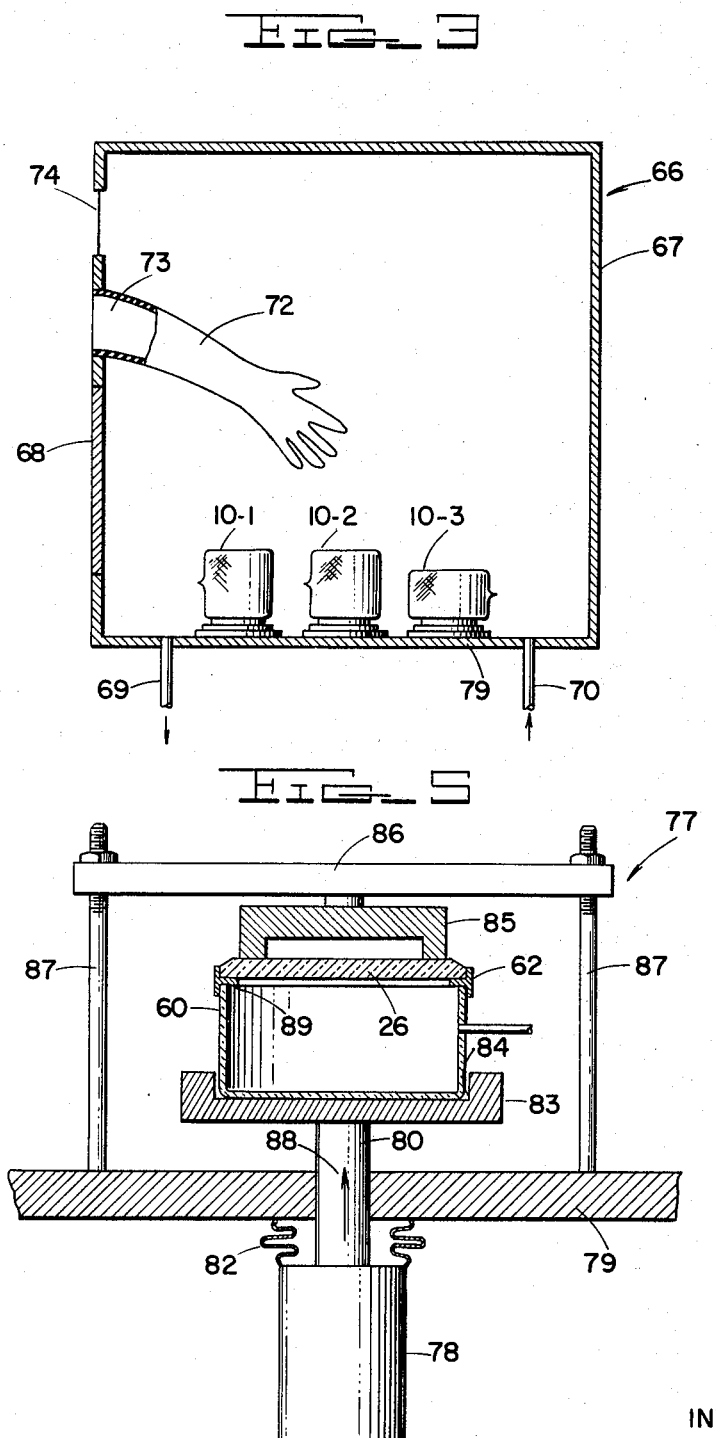

United States Patent Office 3,334,955
Patented Aug. 8, 1967

3,334,955
METHOD AND APPARATUS FOR MAKING
VACUUM TUBES
Cyril L. Day, Huntington, Ind., assignor to International
Telephone and Telegraph Corporation, Nutley, N.J., a
corporation of Maryland
Filed June 3, 1965, Ser. No. 461,000
17 Claims. (Cl. 316—19)

This invention relates generally to methods and apparatus for making vacuum tubes, and more particularly, to a method in which tube parts requiring different processing are separately processed in separate evacuated containers which are subsequently accumulated in an evacuated enclosure, opened, and the tube assembled therein from the separately processed parts, and to a container for use in such method.

In the manufacture of vacuum tubes, it is required that certain of the component parts be outgassed by baking, that other parts be oxidized, and, in the case of image tubes, that the photocathode be sensitized. In the past, it has been necessary to perform some of the processing operations after the tube has been completely assembled and evacuated with the result that the optimum processing for the different types of component parts could not be provided without damage to other parts. It is therefore desirable to provide a method and apparatus in which the various component parts of a tube may be processed separately before assembly, thereby giving each type of part the best possible treatment, the component parts then being brought together and assembled without damage to any of the parts.

It is accordingly an object of the invention to provide an improved method of making vacuum tubes.

Another object of the invention is to provide an improved method of making vacuum tubes in which the component parts are processed separately before assembly.

A further object of the invention is to provide an improved method of making vacuum tubes in which the various component parts requiring different processing are separately processed in separate evacuated containers which are subsequently brought together in an evacuated enclosure, opened, and the parts assembled within the enclosure.

Yet another object of the invention is to provide improved apparatus for use in making vacuum tubes.

A still further object of the invention is to provide an improved container in which vacuum tube parts can be separately processed and stored prior to assembly, and which can be readily opened within an evacuated enclosure for removal of the parts.

In accordance with the improved method of the invention in its broader aspects, the component parts of a tube which require different processing are placed in separate containers which are then closed and evacuated and the parts are then processed as required in the respective containers. The containers with the processed parts therein may then be stored and subsequently be placed in an enclosure which is then evacuated. Each of the containers is then opened within the enclosure, the parts are assembled, and the assembled tube is removed from the enclosure.

The improved container of the invention in its broader aspects comprises a hollow member having open and closed ends and a plate member removably closing the open end, one of the members defining an outwardly facing groove. A thin sheet of material in the nature of a film covers the plate member and the groove and is sealed adjacent its peripheral edge to the open end of the hollow member, thereby permitting the container to be readily opened by cutting through the sheet with a knife at the groove.

The above-ementioned and other features and objects of the invention and the manner of obtaining them will become more apparent and the invention itself will be best understood by reference to the following description of embodiments of the invention taken in conjunction with the accompanying drawings, wherein:

FIG. 1 is a cross-sectional view showing the improved container of the invention arranged for sensitizing a photocathode;

FIG. 2 is a cross-sectional view of a simple image tube;

FIG. 3 is a cross-sectional view of the vacuum glove box employed in the method of the invention;

FIG. 4 is a perspective view illustrating opening of the containers of the invention;

FIG. 5 is a fragmentary side view, partly in section, illustrating assembly of an indium seal ring on the envelope of the tube of FIG. 2 within the vacuum glove box of FIG. 3; and FIG. 6 is a fragmentary side view, partly in section, illustrating the evacuation of the completed tube.

Referrring now to FIG. 1, there is shown a container in accordance with the invention, generally indicated at 10, which may be used to process component parts of a vacuum tube in a vacuum and from which the parts may later be removed in the vacuum or an inert atmosphere for assembly into a vacuum tube without damage to the individual parts.

The container 10 comprises a hollow member or jar 11, preferably cylindrical, having a closed end 12, a wide-mouth open end 14, and an exhaust tubulation 15 formed in its side wall 13. Jar 11 is preferably formed of transparent glass so that the parts therein may be readily visible and also so that light may be introduced thereto if needed during processing of the parts.

Metal flange 16 is provided having a cylindrical portion 17 joined to an annular radially outwardly expanding flange portion 18 by a step 19. Cylindrical flange portion 17 is secured to the open end 14 of the jar 11 by fusing, as is well known to those skilled in the art. An annular metal plate member 20 is provided having flat inner and outer surfaces 22, 23 and a shoulder 24 formed on its outer periphery. Plate member 20 is seated on the step 19 of the flange 16 with its outer surface 23 flush with the outer surface of the annular flange portion 18, shoulder 24 on the plate member 20 thus defining an annular outwardly facing groove 25 with the step 19 of the flange 16.

FIG. 1 illustrates the container 10 emloyed for forming and sensitizing a photocathode on the face plate 26 of an image tube. For this type of processing, a sleeve member 27 is secured to the inner surface 22 of the plate member 20 and removably supports a bracket member 28. A ring 29 having an annular flange 30 is secured to the upper end 32 of the bracket member 28 in any suitable fashion, as by welding, at 33. Faceplate 26 is supported on the upper surface of the annular flange 30, as shown, and is retained in position by suitable spring clips 34. A shield member 35 is provided defining a central opening 36 for exposing that portion of the faceplate 26 upon which the photocathode is to be formed. Shield member 35 is held in asssembled relation with respect to the faceplate 26 by means of suitable spring clips 37 which engage the bottom edge 38 of the ring member 29, as shown.

A gun assembly 39 is provided supported within the jar 11 by means of leads 40, 42, as is well known in the vacuum tube art. Gun assembly 39 includes a cylindrical metal sleeve 43 attached to lead 42 which extends out of the jar 11 to a suitable external terminal 44. Gun assembly 39 has an annular reentrant flange 45 at its end remote from the open end 46. An evaporator wire 48 is disposed within the channel formed by the reentrant flange portion 45 and has one end connected to the sleeve 43 and its other end connected to lead 40 which extends out of the jar 11 to a suitable terminal 49. As is well known to those skilled in the art, beads of material employed in forming the photocathode, such as antimony, silver, etc., are disposed on the evaporator wire 48 and are thus evaporated onto the surface 50 of the faceplate 26 by vapor deposition in response to the application of a suitable voltage at cross-terminals 44, 49 which causes heating of the evaporator wire 48. The cesium for sensitizing or activating the photocathode is contained in a rolled channel or tube 52 having one end connected to lead 53 which extends out of the jar 11 to a suitable external terminal 54 and its other end connected to the sleeve 43. The gun assembly 39 for forming and activating a photocathode is conventional and does not form a part of the present invention, being merely illustrative of one type of tube processing which may be performed in the containers 10.

Other tube parts, such as anode sleeves, cathode sleeves, seal rings, envelopes, and the like, may be placed in containers 10 being supported on the inner surface 22 of the plate member 20 by suitable brackets, or merely resting upon the inner surface 22. It will further be understood that several different parts requiring the same processing may be placed within a single container 10.

In order to seal the container 10 in vacuum-type relationship after the tube parts have been placed therein, a thin metal disc or membrane 55 is provided covering the outer surface 23 of plate member 20, groove 25 and the outer surface of annular flange portion 18 of flange 16. In a specific embodiment of the invention, disc 55 was formed of a sheet of stainless steel .002 inch thick. Disc 55 is provided with an outer diameter substantially the same as the outer diameter of the annular flange portion 18. Annular metal ring 56 is provided having the same outside diameter as the flange portion 18 and having an inside diameter generally the same as the diameter of step 19. Ring 56 is placed on top of the thin disc 55 thereby sandwiching disc 55 between annular flange portion 18 and the annular ring 56. This assembly is then integrally joined at its peripheral edges as by a weld 57. This weld may be formed by placing the assembly in an inert gas welding jig which holds the three members 18, 55, 56 so that their outside diameters match while the weld 57 is run around the peripheral edge thereby forming a vacuum-tight joint. It will be observed that with the seal thus formed, an unsupported annular ring 58 of the disc 55 is provided which overlays the annular groove 25. In the specific embodiment of this invention, the groove 25 and the thus unsupported annular ring 58 is approximately one-eighth inch wide, thereby providing an annular section of the disc 55 which can be readily manually cut with a knife.

After the tube component parts requiring different processing have been placed in separate containers 10 and the containers sealed as above-described, the exhaust tubulation is coupled to a suitable vacuum system and the container evacuated. For parts which require baking, the container is heated to the proper temperature for the proper length of time while under vacuum, thus preventing oxidation. For parts which require oxidizing, such as multiplier parts, the container is first evacuated and pure oxygen is then introduced, the container and the parts therein being baked at the desired temperature for the desired length of time. Alternatively, oxidization may be accomplished by glowing the parts with an RF current. This may be accomplished by connecting an RF lead to the metal flange-ring assembly 18, 56.

Following the desired processing, the tubulation 15 is sealed off and the container with the processed parts therein may then be stored for any desired length of time. In the case of a photocathode, the photocathode may be tested at any time by connecting the metal flange-ring assembly 18, 56 to ground and the gun assembly 39 to an appropriate voltage, the photocathode then being exposed to a known light source and the resultant current being measured in the gun lead.

Referring briefly to FIG. 2, a typical simple image tube which may be processed and assembled by the method and apparatus of this invention is shown. This tube comprises a faceplate 26 having a photocathode 59 formed on its inner surface as above-described. Faceplate 26 is sealed to an envelope 60 by means of an indium seal ring 62. Envelope 60 has a phosphor display screen 63 formed on the inner surface of its end wall 64 with contact 65 brought out through the glass, as shown. The pinched-off exhaust tubulation 65 by which the tube was evacuated, as will be hereinafter described, is formed in the side wall of envelope 60.

Referring now to FIG. 3, a vacuum glove box 66 is provided comprising an enclosure 67 having a door 68 for introducing articles to the interior, a vacuum line 69 by which the interior of the enclosure 67 may be evacuated, and an inert gas line 70 by which inert gas may be introduced to the interior of the enclosure 67. A pair of gloves 72 formed of rubber or other suitable resilient material are positioned within the enclosure 67 and are sealed to the side wall thereof with their interiors 73 communicating with the exterior of the enclosure. Thus, an operator may perform manual operations within the enclosure 67 by inserting his hands in the gloves 72 and observing the operations through the window 74. The vacuum glove box 66 per se is not the subject matter of the present invention, being however, used in the practice of the invention.

In making the image tube 61, shown in FIG. 2, the photocathode 59 is formed on the faceplate 26 and activated in the container 10–1, as described above and illustrated in FIG. 1. The envelope portion 60 of the tube containing the phosphor 63 and the lens structure (not shown) is placed in a separate container 10–2 and baked in a vacuum at a suitable high temperature to ensure proper out-gassing. The indium seal ring 62 must be baked in a vacuum at a much lower temperature for proper out-gassing and thus is placed in still another container 10–3. After these parts have been separately processed in their individual containers 10, as above-described, they may be stored in a clean place until final assembly. At this time, the three containers 10–1, 10–2, 10–3 are placed in the vacuum glove box 66 along with the necessary tools and other equipment needed in the assembly. Then the door 68 is enclosed and sealed. The vacuum line 69 is then coupled to a suitable vacuum pump (not shown) and the enclosure 67 is evacuated for a sufficient length of time to allow the displacement of the gasses on the surface of the containers 10 and the tools and other equipment. Gas line 70 is then coupled to a suitable source of inert gas, such as helium, argon, or neon, that is highly purified, and the enclosure 67 is flushed a number of times and is then filled with the inert gas to a pressure of about one pound per square inch and that pressure is maintained while the gas is circulated through a suitable purifier (not shown).

The operator then inserts his hands and arms in the gloves 72 and with a knife 75, which was among the tools previously placed in the enclosure 67, as above-described, opens each of the containers 10 by cutting through the annular unsupported ring 58 of the disc 55 into the annular groove 25, as indicated by the dashed lines 76 in FIG. 4. With this cut made, the metal plate 20 can be manually removed from the respective container 10 and the previously processed parts within the container removed.

Referring now to FIG. 5, vacuum box 66 is provided with a press assembly 77. Press assembly 77 comprises a hydraulic jack 78 positioned exteriorly of the bottom wall 79 of the enclosure 67 and having its ram 80 extending upwardly through the bottom wall 79. A vacuum shield is provided by suitable bellows 82 connected between hydraulic jack 78 and the outer surface of the bottom wall 79, as shown. Ram 80 has a bottom press plate 83 on its upper end having a recess 84 formed in its upper surface in which the envelope 60 is positioned. The indium seal ring 62 is then placed on the open end of the envelope 60 and the faceplate 26 with the photocathode 59 thereon is placed on the indium seal ring. A top press plate 85 is provided mounted on a bracket 86 which is adjustably mounted on the bottom wall 79 by means of suitable threaded fasteners 87. After the envelope 60 has been positioned in the recess 84 in the bottom press plate 83 and the indium seal ring 62 and faceplate 26 assembled thereon, hydraulic jack 78 is actuated to extend the ram 80 upwardly, as shown by the arrow 88, thereby to raise the assembly so that the top surface of the faceplate 26 is engaged by the top press plate 85, thereby applying pressure to the indium seal ring. Indium acts as a solder under pressure, and the resultant application of pressure causes the flange portion 89 of the indium seal ring to deform, as shown in FIG. 2, so that the faceplate 26 is sealed to the envelope 60 in vacuum-type relationship, as is well known to those skilled in the art. Hydraulic jack 78 is again actuated to retract the ram 80 and the now assembled tube 61 is removed from the bottom press plate 83.

The tube 61 is now completely assembled, but is still filled with the inert gas. In order to remove the inert gas from the tube 61, the exhaust tubulation 65 is coupled to one side 90 of a T 92 attached to a convention ion pump 93. It will be understood that T 92 and ion pump 93 were part of the equipment originally placed in the enclosure 67 along with the containers 10. The other end 94 of the T 92 is attached to a length 95 of copper tubing which in turn is connected to the vacuum line 69 by conventional flare fitting 96. Vacuum line 69 is connected to a suitable vacuum pump, such as a mercury pump 97. Mercury pump 97 is then actuated and after the ion pump 93 and tube 61 have been sufficiently evacuated that the ion pump 93 will start, the glove box 66 is opened and the assembly is sealed-off by pinching-off the length of copper tubing 95. The tube 61 and ion pump assembly 93 is then removed from the glove box 66 through the door 68. Evacuation of the tube 61 by the ion pump 93 is then continued and after the requisite high vacuum has been obtained, the tubulation 65 on the tube 61 is then pinched-off and the tube is now complete and ready for testing.

It will now be seen that the method and apparatus of the invention permits the proper processing of each of the component parts of the vacuum tube, storage after processing for any desired length of time, and assembly of the final tube without damage to any of the individual parts.

While there have been described above the principles of this invention in connection with specific apparatus, it is to be clearly understood that this description is made only by way of example and not as a limitation to the scope of this invention.

What is claimed is:

1. The method of making vacuum tubes comprising the steps of: placing the component parts of a tube which require different processing in separtae containers; closing each of said containers and evacuating the same; processing said parts in the respective containers; placing said containers in an enclosure and evacuating the same; opening each of said containers in said enclosure; assembling said parts in said enclosure; and removing the assembled tube from said enclosure.

2. The method of claim 1 comprising the further steps of introducing an inert gas into said enclosure, thereby creating an inert atmosphere therein, said containers being openend and said parts assembled in said inert atmosphere; and evacuating said tube while in said enclosure.

3. The method of claim 1 comprising the further steps of coupling the assembled tube while in said enclosure to an ion pump located in said enclosure and to a vacuum pump located outside of said enclosure; initially evacuating said tube with both of said pumps; disconnecting said tube from said vaccum pump; removing said tube with said ion pump connected thereto from said enclosure; and finally, evacuating said tube with said ion pump; and disconnecting said tube from said ion pump.

4. The method of claim 1 comprising the further steps of flushing said enclosure with an inert gas after evacuation thereof and creating an inert atmosphere therein, said containers being opened and said parts assembled in said inert atmosphere; coupling the assembled tube while in said inert atmosphere to an ion pump located in said enclosure and a vacuum pump located outside of said enclosure; initially evacuating said tube with both of said pumps; disconnecting said tube from said vacuum pump; removing said tube with said ion pump connected thereto from said enclosure; and finally, evacuating said tube with said ion pump; and disconnecting said tube from said ion pump.

5. The method of claim 1 wherein each of said containers has an open end; wherein said step of closing each of said containers comprises placing a thin sheet across the open end of the container and sealing the same thereto; and wherein the step of opening each of said containers comprises cutting said sheet.

6. The method of claim 1 wherein each of said containers is cylindrical and has an open end and a radially outwardly extending annular metal flange attached to its open end, each of said flanges having an annular step formed therein between said open end of the respective container and the outer peripheral edge of said flange; wherein said step of closing each of said containers comprises placing an annular metal plate in said step closing said open end of the respective container, said plate having a peripheral edge defining an annular outwardly facing groove with said step, and placing a thin metallic sheet over said plate groove and flange and sealing said sheet to said flange; and wherein the step of opening each of said containers comprises cutting said sheet with a sharp instrument around said groove, and removing said plate.

7. A container for processing articles comprising: a hollow member having open and closed ends; a plate member removably closing said open end; one of said members defining an outwardly facing groove; and a thin sheet covering said plate member and groove and sealed adjacent its peripheral edge to said open end whereby said container may be opened by cutting through said sheet at said groove.

8. The container of claim 7 wherein said plate member has a peripheral edge defining said groove with said open end of said hollow member.

9. The container of claim 7 wherein said hollow member has an outwardly extending flange portion formed thereon at said open end, and wherein said sheet covers said flange portion and is sealed thereto adjacent the peripheral edge thereof.

10. The container of claim 9 wherein said flange portion has an outwardly facing step formed therein, said plate member being seated on said step.

11. The container of claim 7 wherein said hollow member has an outwardly extending flange portion formed thereon at said open end, said flange portion having an outwardly facing step formed therein, said plate member being seated on said step, said plate member having a peripheral edge defining said groove with said step; and wherein said sheet covers said flange portion and is sealed thereto adjacent the peripheral edge thereof.

12. The container of claim 11 wherein said hollow member is formed of non-metallic material and said flange portion, plate member and sheet are metallic.

13. The container of claim 7 wherein said hollow member is formed of transparent glass and same plate member and sheet are metallic.

14. The container of claim 7 wherein said hollow member has an exhaust tubulation formed thereon for evacuating the same.

15. The container of claim 7 further comprising means on the side of said plate member facing said closed end for supporting articles to be processed.

16. The container of claim 7 wherein said hollow member is cylindrical and formed of transparent glass with an exhaust tubulation formed thereon for evacuating the same; and further comprising an annular radially outwardly extending metal flange joined to said open end of said hollow member, said flange having an annular outwardly facing step formed therein between said open end and the outer peripheral edge thereof; wherein said plate member is annular and formed of metal and is seated on said step, said plate member having a flat outer surface flush with the outer surface of said flange, said plate member having a peripheral edge defining said groove with said step; wherein said sheet is annular and metallic and covers said flange; and further comprising an annular metal ring engaging said sheet and clamping the same against said flange, said flange and ring being tightly secured together thereby sealing said sheet to said flange.

17. The container of claim 16 wherein the peripheral edges of said flange and ring are integrally joined.

No references cited.

RICHARD H. EANES, Jr., *Primary Examiner.*